United States Patent Office 2,735,783
Patented Feb. 21, 1956

2,735,783

CELLULOSE ORGANIC ESTER MOLDED OBJECTS CONTAINING PHOTOTROPIC DYES

John W. Tamblyn and Gerald M. Armstrong, Kingsport, Tenn., assignors to Eastman Kodak Company, Rochester, N. Y., a corporation of New Jersey No Drawing. Application March 22, 1952, Serial No. 278,108

4 Claims. (Cl. 106—193)

This invention relates to molded objects of cellulose organic acid ester plastics, such, for instance, as cellulose acetate, cellulose acetate-propionate, and cellulose acetate-butyrate. More particularly, it relates to molded objects of cellulose organic ester plastics, having increased resistance to weathering.

It is customary, in formulations of cellulose ester plastics for outdoor applications, to incorporate a small percentage of a compound, for example, phenyl salicylate, which has a strong absorption for the most damaging region of the sun's ultraviolet radiation. A primary requirement for such a weathering inhibitor is that it be able to dispose of its absorbed ultraviolet light in a manner which will be non-destructive both to itself and to the cellulose ester molecules.

We have found that a compound such as a phototropic dye, which can undergo a reversible energy-absorbing internal rearrangement upon absorption of a light quantum, is ideally suited to fulfill this requirement. The absorbed light energy causes the dye molecule to change to a different colored form, which later, in the dark, reverts to the original form with release of the energy in small vibrational packet non-harmful to the plastic.

The use of a phototropic dye in a plastic does not suffer from the disadvantage associated with its use on a fiber. The color change during exposure to sunlight is confined to a thin surface layer. In cellulose acetate fiber, the color change in the thin layer is quite apparent to the eye. In a molded object, on the other hand, no color change is apparent to the eye, because the depth of unchanged color in the interior disguises the shallow surface change.

A number of dyes having phototropic properties on cellulose acetate fiber, have been tested as weathering inhibitors when incorporated in the proportion of 1 part by weight in 112 parts by weight of a plastic composed of 100 parts by weight of cellulose acetate-butyrate of 37% butyryl, 13% acetyl content, and 12 parts by weight of dibutyl sebacate. Compression-molded sheets, ½ inch wide by 3 inches long by 0.050 inch thick, were used as the test pieces. Accelerated weathering was carried out in an Atlas Twin-Arc Weather-ometer operating on the 51 min.:9 min. dry-wet cycle with the sample drum rotating once a minute. The progress of weathering was followed by qualitative observations of color and haze development and by quantitative measurements of inherent viscosity, stiffness and brittleness. Inherent viscosities were measured on acetone solutions at a concentration of 0.23 g./100 cc. Brittleness was defined to have developed when a break occurred at a bend angle of less than 90° in the Tour-Marshall test for stiffness in flexure (A. S. T. M. D747–43T).

The following table illustrates how effectively these dyes protect the plastic from the damaging effects of exposure in the accelerated weathering test just described.

| Inhibitor Used | Exposure Time (Hr.) Required for— | | Original Color | Color Dev. on Exposure | Haze Dev. on Exposure |
| --- | --- | --- | --- | --- | --- |
| | 25% Loss in Inherent Viscosity | Dev. of Brittleness | | | |
| None | 250 | 400 | None | None | Considerable. |
| Phenyl Salicylate | 650 | 800 | do | do | Moderate. |
| p-Phenylazodiphenylamine | >1,700 | >1,700 | Yellow-Orange | Slight Darkening. | None. |
| p-[p-(Dimethylamino)phenylazo]acetanilide | >2,600 | >3,100 | Orange-Brown | None | Slight. |
| p-[o-Chlorophenylazo]-N,N-dimethylaniline | >1,700 | >1,700 | Red-Orange | do | None. |
| 4-[o-Chlorophenylazo]-N-methyl-m-toluidine | >1,700 | >1,700 | Orange | do | Do. |
| 2,5-Dimethoxy-4-phenylazoaniline | 1,500 | 900 | Red | Darkened, then Bleached. | Moderate. |

The plastic composition may be varied over wide limits as to nature and concentration of components. For example, the amount and nature of the plasticizer may be widely varied. Many plasticizers for cellulose organic esters are known in the prior art. The cellulose organic ester itself may be varied. For instance, cellulose acetate or cellulose acetate-propionate may be used instead of cellulose acetate-butyrate. The acyl contents of the cellulose ester may be varied. Fillers and pigments may be incorporated in the plastic. The concentration of the phototropic dye may vary from 0.1 part to 10 parts by weight per 100 parts by weight of the cellulose ester. The phototropic dye may be used in combination with other types of inhibitor, such as antioxidant, pH regulator and the like.

The plastic composition may be compounded by any of the methods known in the art, e. g. by rolling on hot rolls. The objects may be molded by any of the known methods of molding cellulose organic ester plastics, e. g. by compression molding, injection molding, or die extrusion.

What we claim as our invention and desire to be secured by Letters Patent of the United States is:

1. A molded object composed of a cellulose organic acid ester plastic comprising a cellulose ester selected from the group consisting of cellulose acetate, cellulose acetate-propionate, and cellulose acetate-butyrate, a plasticizer for the cellulose ester, and, as a weathering inhibitor, from 0.1 part to 10 parts by weight, per 100 parts by weight of cellulose ester, of a phototropic azo dye selected from the group consisting of p-phenylazodiphenylamine, p-[p-di-methylamino)phenylazo]acetanilide, p-[o - chlorophenyl-azo] - N,N - dimethylaniline, 4-[o-chlorophenylazo] - N-methyl-m-toluidine and 2,5 - dimethoxy - 4 - phenylazo-aniline.

2. A molded object composed of a cellulose acetate plastic comprising cellulose acetate, a plasticizer for the cellulose acetate, and, as a weathering inhibitor, from 0.1 part to 10 parts by weight, per 100 parts by weight of cellulose acetate, of a phototropic dye selected from the group consisting of p-phenylazodiphenylamine, p-[p-(dimethylamino)phenylazo]acetanilide, p-[o - chlorophenylazo] - N,N - dimethylaniline, 4-[o-chlorophenylazo] - N-methyl - m - toluidine and 2,5 - dimethoxy-4-phenylazoaniline.

3. A molded object composed of a cellulose acetate-butyrate plastic comprising cellulose acetate-butyrate, a plasticizer for the cellulose acetate-butyrate, and, as a weathering inhibitor, from 0.1 part to 10 parts by weight, per 100 parts by weight of cellulose acetate-butyrate, of a phototropic dye selected from the group consisting of p-phenylazodiphenylamine, p-[p-(dimethylamino)phenylazo]acetanilide, p-[o-chlorophenylazo] - N,N - dimethylaniline, 4-[o-chlorophenylazo]-N-methyl-m-toluidine and 2,5-dimethoxy-4-phenylazoaniline.

4. A molded object composed of a cellulose organic acid ester plastic comprising a cellulose ester selected from the group consisting of cellulose acetate, cellulose acetate-propionate, and cellulose acetate-butyrate, a plasticizer for the cellulose ester, and, as a weathering inhibitor, approximately 1 part by weight, per 100 parts by weight of cellulose ester, of a phototropic azo dye selected from the group consisting of p-phenylazodiphenylamine, p-[p-dimethylamino)phenylazo]acetanilide, p-[o - chlorophenylazo] - N,N - dimethylaniline, 4-[o-chlorophenylazo] - N-methyl - m - toluidine and 2,5 - dimethoxy-4-phenylazoaniline.

References Cited in the file of this patent

UNITED STATES PATENTS

| | | |
|---|---|---|
| 2,038,298 | Kiernan | Apr. 21, 1936 |
| 2,120,741 | Graenacher | June 14, 1938 |
| 2,141,667 | Petitcolas | Dec. 27, 1938 |
| 2,150,692 | McNally | Mar. 14, 1939 |
| 2,186,942 | Vierling | Jan. 16, 1940 |
| 2,233,429 | Ostromislensky | Mar. 4, 1941 |
| 2,289,414 | Ellis et al. | July 14, 1942 |
| 2,290,949 | Dreyfus | July 28, 1942 |
| 2,305,693 | Hanel | Dec. 22, 1942 |
| 2,347,704 | McNally et al. | May 2, 1944 |